(12) United States Patent
Putz

(10) Patent No.: US 11,292,442 B2
(45) Date of Patent: Apr. 5, 2022

(54) ELECTROMECHANICAL BRAKE SYSTEM

(71) Applicant: GREENBRAKES GMBH, Hartberg (AT)

(72) Inventor: Michael Putz, Sebersdorf (AT)

(73) Assignee: GREENBRAKES GMBH, Hartberg (AT)

( * ) Notice: Subject to any disclaimer, the term of this patent is extended or adjusted under 35 U.S.C. 154(b) by 0 days.

(21) Appl. No.: 17/415,238

(22) PCT Filed: Dec. 3, 2019

(86) PCT No.: PCT/EP2019/083473
§ 371 (c)(1),
(2) Date: Jun. 17, 2021

(87) PCT Pub. No.: WO2020/126472
PCT Pub. Date: Jun. 25, 2020

(65) Prior Publication Data
US 2022/0041143 A1    Feb. 10, 2022

(30) Foreign Application Priority Data

Dec. 17, 2018 (AT) ............... A 51123/2018

(51) Int. Cl.
*B60T 8/171* (2006.01)
*B60T 8/1761* (2006.01)
(Continued)

(52) U.S. Cl.
CPC ............. *B60T 8/171* (2013.01); *B60T 8/172* (2013.01); *B60T 8/1761* (2013.01); *B60T 8/885* (2013.01);
(Continued)

(58) Field of Classification Search
CPC ........ B60T 8/171; B60T 8/172; B60T 8/1761; B60T 8/885; B60T 13/746; B60T 2270/40; B60T 2270/82
See application file for complete search history.

(56) References Cited

U.S. PATENT DOCUMENTS 9,157,820 B2 * 10/2015 Heise .................. G01L 5/28
9,174,622 B2 * 11/2015 Shiraki ............. B60T 13/741
(Continued)

FOREIGN PATENT DOCUMENTS

DE        19742920 A1    4/1999
DE    102016200614 A1    7/2017
(Continued)

OTHER PUBLICATIONS

Office Action in Austria Application No. A 51123/2018, dated Sep. 25, 2019, 4 pages.
(Continued)

*Primary Examiner* — Hussein Elchanti
(74) *Attorney, Agent, or Firm* — Liang & Hennessey LLP; Brian Hennessey

(57) ABSTRACT

A brake system includes an electromechanical brake having a friction surface, a lining support having a brake lining, an electric motor for moving the lining support, and a control and monitoring unit. The control and monitoring unit ascertains, from a first value ascertained during a first movement of the lining support by the electric motor, an operating parameter of at least one part of the brake, and a second value ascertained during a second movement opposite to the first movement of the lining support, by the electric motor, an operating behavior value for a real operating behavior of the relevant brake, and ascertains, by comparing the at least one real operating behavior value to at least one stored operating behavior expectation, a correction factor. The brake control system is corrected by the one correction (Continued)

factor and a regulator of the electric motor is activated using the corrected brake control signal.

32 Claims, 1 Drawing Sheet

(51) Int. Cl.
    *B60T 13/74* (2006.01)
    *B60T 8/88* (2006.01)
    *B60T 8/172* (2006.01)

(52) U.S. Cl.
    CPC ......... *B60T 13/746* (2013.01); *B60T 2270/40* (2013.01); *B60T 2270/82* (2013.01)

(56) References Cited

U.S. PATENT DOCUMENTS

| | | | | |
|---|---|---|---|---|
| 2008/0071454 A1* | 3/2008 | Shiraki | ............... | B60T 7/122 701/70 |
| 2008/0071455 A1* | 3/2008 | Shiraki | ............... | B60T 13/746 701/70 |
| 2013/0151101 A1 | 6/2013 | Szymanski et al. | | |
| 2014/0200784 A1* | 7/2014 | Nohira | ............... | B60T 8/17 701/70 |
| 2017/0327095 A1* | 11/2017 | Leitermann | ............. | B60T 8/3205 |
| 2021/0354679 A1* | 11/2021 | Putz | ............... | B60T 8/172 |
| 2021/0370913 A1* | 12/2021 | Yang | ............... | B60W 40/076 |
| 2021/0379713 A1* | 12/2021 | Sun | ............... | B23Q 3/15722 |

FOREIGN PATENT DOCUMENTS

| | | |
|---|---|---|
| EP | 0626297 A1 | 11/1994 |
| WO | 2014170259 A2 | 10/2014 |

OTHER PUBLICATIONS

International Search Report and Written Opinion in International Application No. PCT/EP2019/083473, dated Apr. 17, 2020, 14 pages.

* cited by examiner

ELECTROMECHANICAL BRAKE SYSTEM

CROSS-REFERENCE TO RELATED APPLICATIONS

The present application is a national phase application of PCT Application No. PCT/EP2019/083473, filed Dec. 3, 2019, entitled "ELECTROMECHANICAL BRAKE SYSTEM", which claims the benefit of Austrian Patent Application No. 51123/2018, filed Dec. 17, 2018, each of which is incorporated by reference in its entirety.

BACKGROUND OF THE INVENTION

1. Field of the Invention

The invention relates to an electromechanical brake system including at least one electromechanical brake.

2. Description of the Related Art

The actuation of a vehicle brake by means of an electric motor instead of a hydraulic or pneumatic system is known per se. However, it has been shown that the actuation of a brake, during which braking is also actually to take place with a specific braking torque or a braking action predefined in another way, is linked in practice to numerous problems, because of which it has only been possible with great effort up to this point to operate an electromechanical brake system safely and predefinably.

The braking torque is—with known coefficients of friction and dimensions of the participating brake lining and the brake disk—directly proportional to the contact pressure of the at least one brake lining on the brake disk. However, in practice neither the coefficient of friction nor the contact pressure is known.

The contact pressure can be directly ascertained as such by means of a so-called normal force sensor or another force sensor and can be incorporated into a corresponding control. However, since a brake of a road vehicle is a safety-relevant system, significant technical demands with respect to the measurement accuracy and also the reliability are placed on a corresponding force sensor. In practice, this would have the result that a corresponding brake system having a sufficiently accurately measuring and moreover multiply redundant force measuring system would be very technically complex and costly. Moreover, such a system, in spite of all efforts to make it safe, would still be problematic with respect to safety, since the entire function of the brake system is dependent on the reliable functioning of the force measuring system. A failure of this system or also only a correspondingly wide-ranging deviation of the measurement accuracy would have grave results for life and limb of the vehicle occupants and possibly further uninvolved road users.

The braking torque can already be estimated, without using a force measuring system, via the current consumption of the electric motor, which is used as the drive for the mechanism of the brake system which presses the at least one brake lining against the brake disk. However, it has been shown that this is too inaccurate in practice to control or regulate the actuation of a brake solely via its current consumption. The relevant electric motor does not act directly or immediately on the brake lining, but rather drives a mechanical system, the properties of which are subjected to continuous changes. It is in the nature of a vehicle that within a short time it moves from one location to another location. At the same time, both the ambient conditions and also the conditions on the vehicle itself change, for example due to changes of the temperature, the humidity, the scope and the detailed composition of the lubricants in the brake system, and due to soiling. A regulation which is exclusively based on the basis of the current consumption of the electric motor is not possible in practice because of these continuous changes.

SUMMARY OF THE INVENTION

The object of the invention is therefore to specify an electromechanical brake system of the type mentioned at the outset, using which the mentioned disadvantages can be avoided, and in which the most accurate possible setting of a predefinable braking action is possible with little expenditure for required sensors.

This is achieved according to the invention.

A predefined braking action can thus be set very accurately with little expenditure for required sensors.

The respective prevailing mechanical properties of the brake system, and the relationship thereof to at least one operating parameter used during the activation of the brake, are thus continuously ascertained, which properties are taken into consideration during the actuation of the brake. Changes of the brake system, which occur, for example, between taking the brake system out of operation and putting it back into operation and/or in running operation, can thus be recognized and taken into consideration reliably. It is thus possible to activate the brake, starting from a specification of a braking action, in such a way that this braking action is also actually achieved, and to do so without a complex and error-prone force measuring system, in particular a normal force measuring system, being required for this purpose. The present electromechanical brake system has a simple structure and is very operationally reliable since the evaluated operating parameters are required in any case for the movement or the operation of the brake.

It has been shown that a brake or a brake system has a different behavior, often also only slightly, during the movement of the at least one brake lining in the direction toward the friction surface than during movement of the at least one brake lining in the opposite direction, thus away from the friction surface. This differing behavior can have multiple causes, which have effects of different strengths. For example, during the braking, the at least one brake lining is pressed against the friction surface against the torque of the electric motor. Deformations, which are typically reversible, occur here—due to the finite rigidity of real components. It is therefore necessary for the electric motor to also overcome these deformations and the corresponding losses to actually achieve a specific contact pressure of the brake lining on the friction surface. Upon the release of the brake, therefore when lifting or removing the brake lining from the friction surface, however, the energy stored in the elastic deformations of the actuating mechanism acts in the same direction as the—deflected—movement of the electric motor. The torque on the motor is therefore correspondingly less during the release of the brake than during the actuation of the brake, since the energy stored in reversible deformations now assists the release of the brake. However, losses, in particular friction losses, act against the release of the brake. This differing behavior has proven to be relevant in practice for the accurate activation of the brake.

Further relevant causes for this different behavior are, for example, friction losses, which can also result differently depending on the movement direction.

In that in the present brake system both the behavior during a movement of the brake in the direction of a braking procedure and also in the direction of a release of the brake is ascertained or measured, the different properties or differences ascertained here are taken into consideration in the activation of the brake system. The "instantaneous" operating behavior is compared to a stored expectation, whereby an improvement of the accuracy can be achieved. This adaptation or a corresponding update can take place during the entire operation of the brake system.

The brake system can thus be activated or operated safely and accurately in any movement direction with consideration of friction, stiffness, inertia, and soiling of the participating moving parts. An accurate position control and/or force or torque control of the at least one brake lining is thus possible.

The invention furthermore relates to a method for operating an electromechanical brake system.

The object of the invention is therefore to specify a method of the above-mentioned type, using which the mentioned advantages can be avoided, and in which the most accurate possible setting of a predefinable braking action is possible with little expenditure for required sensors.

This is achieved according to the invention.

The advantages claimed above for the electromechanical brake system can thus be achieved.

The dependent claims relate to further advantageous embodiments of the invention.

Reference is expressly made here by to the wording of the claims, whereby the claims are incorporated at this point by reference into the description and are considered to be reproduced verbatim.

BRIEF DESCRIPTION OF THE DRAWINGS

The invention is described in more detail with reference to the appended drawings, in which solely preferred embodiments are illustrated by way of example. In the figures.

DETAILED DESCRIPTION

Figure 1:
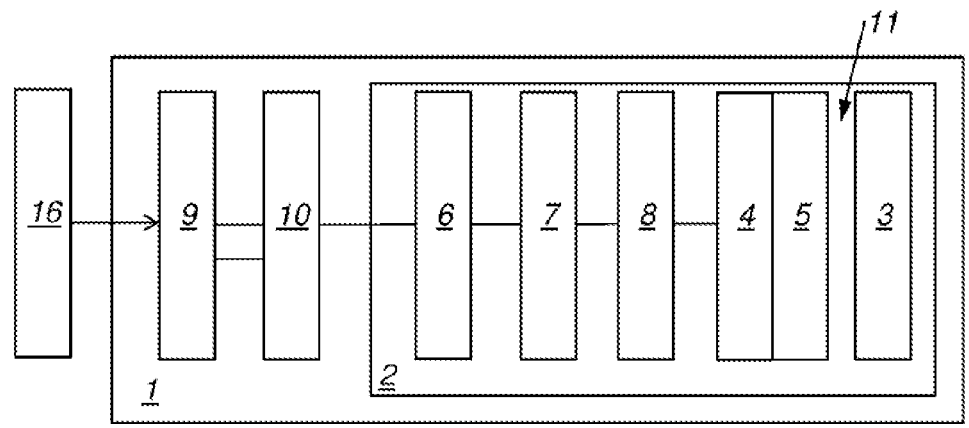
FIG. 1 shows a block diagram of a first embodiment of a present brake system.

FIG. 1 shows a block diagram of a preferred embodiment of an electromechanical brake system 1 comprising at least one electromechanical brake 2, wherein the electromechanical brake 2 includes
  at least one friction surface 3,
  at least one lining support 4 having at least one brake lining 5,
  at least one electric motor 6 for the predefinable movement of the lining support 4,
  an actuating mechanism 7, on which the lining support 4 is mounted, and which is connected to the electric motor 6, and
  preferably at least one mechanical readjustment device 8, which can be connected to the actuating mechanism 7, for example,
  wherein the brake system 1 has a control and monitoring unit 9, which is designed to receive a braking action request on the input side and to generate a brake control signal on the basis of the braking action request and output it to a regulator 10 of the electric motor 6, wherein the control and monitoring unit 9 is designed:

to ascertain, from at least one first value, which is ascertained during a first movement of the lining support 4 by means of the electric motor 6, of at least one first operating parameter of at least one part of the brake 2, and at least one second value, which is ascertained during a second movement of the lining support 4 by means of the electric motor 6 opposite to the first movement, of the first operating parameter of the part of the brake 2, at least one operating behavior value, in particular an operating behavior value set, preferably an operating behavior function, for a real operating behavior of the relevant brake 2, and to ascertain, by a comparison of the at least one real operating behavior value to at least one stored operating behavior expectation, at least one correction factor, in particular at least one correction factor set, preferably at least one correction curve, and furthermore to correct the brake control system by the at least one correction factor, in particular the correction factor set, preferably the correction curve, and to activate the regulator using the corrected brake control signal.

A predefined braking action can thus be set very accurately with little expenditure for required sensors.

The respective prevailing mechanical properties of the brake system 1, and the relationship thereof to at least one operating parameter used during the activation of the brake 2, are thus continuously ascertained, which properties are taken into consideration during the actuation of the brake 2. Changes of the brake system 1 can thus be recognized and taken into consideration reliably. It is thus possible to activate the brake 2 starting from a specification of a braking action in such a way that this braking action is also actually achieved, and to do so without a complex and error-prone force measuring system, in particular a normal force measuring system, being required for this purpose. The present electromechanical brake system 1 is also furthermore operationally reliable, even if a possibly provided force sensor should be faulty or fails.

The present electromechanical brake system 1 has a simple structure and is very operationally reliable since the evaluated operating parameters are required in any case for the actuation of the brake 2.

It has been shown that a brake 2 or a brake system 1 has a different behavior, often also only slightly, during the movement of the at least one brake lining 5 in the direction toward the friction surface 3 than during movement of the at least one brake lining 5 in the opposite direction, therefore away from the friction surface 3. This differing behavior can have multiple causes, which have effects of different strengths. For example, during a braking procedure, the at least one brake lining 5 can be pressed against the friction surface 3 against the torque of the electric motor 6. Elastic deformations occur at the same time. It is therefore necessary for the electric motor 6 to also overcome these deformations or the corresponding losses in order to actually achieve a specific contact pressure of the brake lining 5 on the friction surface 3. Upon the release of the brake 2, therefore upon lifting or removal of the brake lining 5 from the friction surface 3, however, the energy stored in the elastic deformations of the actuating mechanism 7 acts in the same direction as the—redirected—movement of the electric motor 6. The torque on the electric motor 6 is therefore correspondingly lower upon the release of the brake 2 than upon the actuation of the brake 2, since the energy stored during the elastic deformations assists the release of the brake. This differing behavior has proven to be relevant in practice for the precise activation of the brake system 1.

Further relevant causes for this differing behavior are, for example, friction losses, which can also result differently depending on the movement direction.

In that in the present brake system 1 both the behavior during a movement of the brake 2 in the direction of a braking procedure and also in the direction of a release of the brake 2 is ascertained or measured, the different properties or differences ascertained here are taken into consideration in the activation of the brake system. The "instantaneous" operating behavior is compared to a stored expectation, whereby an improvement of the accuracy can be achieved. This adaptation or a corresponding update can take place during the entire operation of the brake system 1.

The brake system 1 can thus be activated or operated safely and accurately in any movement direction in consideration of friction, stiffness, inertia, and soiling of the participating moving parts. Precise position control of the at least one brake lining 5 is thus possible.

Furthermore, changes, in particular temperature-dependent changes of the viscosity of the participating lubricants and also changes, in particular temperature-dependent changes of the moduli of elasticity of the materials of the individual parts of the brake 2 participating in the movement can thus also be taken into consideration.

In that in the present brake system 1 both the behavior during a movement of the brake 2 in the direction of a braking procedure and also in the direction of a release of the brake 2 is ascertained or measured, the different properties or differences ascertained here are taken into consideration in the activation of the brake system. The brake system 1 can thus be activated or operated safely and accurately in any movement direction in consideration of friction, stiffness, inertia, and soiling of the participating moving parts. Precise position control of the at least one brake lining 5 is thus possible.

The first or second movement can be extremely minor and can be at the limit of what is measurable.

The present invention relates to an electromechanical brake system 1, which comprises at least the actual electromechanical brake 2 and a control and monitoring unit 9 required for its operation, wherein still further components, in particular sensors, can be part of the electromechanical brake system 1.

The present electromechanical brake system 1 is provided to brake a relative movement between two parts. In particular, the present brake system 1 is provided to brake at least one rotating component. This can be any type of a rotating component, wherein the brake 2 can also be provided for braking linear movements. As such, the present brake system 1 can be part, for example, of an escalator, an elevator, or a wind turbine. In particular, the brake system 1 is provided to be installed in a vehicle, in particular a single-track or multitrack vehicle, or to be part of a vehicle. This can be any type of a wheeled vehicle or tracked vehicle. In particular, the vehicle is at least one vehicle selected from the group: automobile, aircraft, motorcycle, motor vehicle trailer, tractor, rail vehicle. The brake system 1 can be provided here, for example, for braking drive wheels, or also for braking other moving parts of a device or a vehicle. For example, the use as a brake of a cable drum of a crane can be provided.

An electromechanical brake 2 in the present context can be any type of a brake 2 in which the actuation of the brake 2, therefore the movement of the brake lining 5 in the direction of the friction surface 3 upon braking or the release of the brake 2, is performed by the drive by means of an electric motor 6. It is provided that the movement generated directly by the electric motor 6 is redirected by means of a mechanism, the so-called actuating mechanism 7. A brake 2 in which the actual actuation is carried out by means of hydraulics or pneumatics is not considered to be an electromechanical brake 2, even if the operating pressure of the fluid used is generated using an electrically driven pump, and/or if electrically actuated valves are used.

The electric motor 6 can be any form of an electric motor 6, for example a linear motor, a rotation machine, a DC motor, or an AC motor, etc. It is preferably provided that the electric motor 6 is designed as a rotation machine. It is furthermore particularly preferably provided that the electric motor 6 is designed as a brushless DC motor. Such an electric motor 6 is also referred to in English as a BLDC motor, wherein BLDC—in a way known per se—stands for brushless direct current.

The electromechanical brake system 1 includes at least one regulator 10 to activate the electric motor 6 or to enable a corresponding regulation of the electric motor 6. The regulator 10 or the regulating unit is electrically connected to the electric motor 6 and is designed, for example, comprising an inverter circuit or bridge circuit. The regulator 10 can be designed as any arbitrary regulator and also according to any arbitrary method, if the regulator is designed or is capable of regulating, specifically in particular a position and/or a torque. The regulator 10 obviously has to be technically capable of regulating the respective selected electric motor 6.

In the present preferred embodiment of the electric motor 6 as a BLDC motor, it is preferably provided that the regulator 10 is designed as a regulator 10 designed or provided especially for BLDC motors. Such regulators 10, which comprise a position, torque, and speed regulation, are known in the relevant technical field of the regulation of BLDC motors. In particular, it is presently provided that such a regulator 10 transfers position, torque limit, and speed limit simultaneously to the control and monitoring unit 9.

Furthermore, it can be provided here that the regulator 10 is designed as a vector regulator. A vector regulator is also referred to in English as an FOC: field-oriented control.

Furthermore, a regulator 10 can also be designed comprising at least one PID controller.

It can preferably moreover be provided that the regulator applies a first parameter set to carry out the first movement and applies a second parameter set to carry out the second movement.

Of course, a brake 2 can also include more than only one electric motor 6. It can preferably be provided that the brake 2 furthermore includes a second electric motor (not shown in the figures), which second electric motor can be designed in such a way or can have a corresponding self-inhibiting gearing, such as a spindle drive or a worm wheel, such that it can retain a predefinable torque even upon power loss. A parking brake function can thus be achieved easily. The second electric motor can be operated according to all embodiments or methods as described for electric motor 6. It is provided in particular here that the respective correction factors ascertained for one of the two electric motors are also taken into consideration during the operation of the other of the two electric motors. In particular, it can thus be ensured, upon the use of the optional second electric motor to implement a parking function, that the brake lining is pressed with sufficient, but not excessively high force on the friction surface.

In this context, it can furthermore be provided that a second electric motor designed in this way is activated during a normal braking procedure in such a way that it causes a part of the movement of the lining support 5, for example in the form of a rough setting of the position of the lining support 5, and that the first electric motor 6 performs the fine setting of the lining support.

Of course, the second electric motor can also be provided solely for reasons of redundancy, to ensure the function of the brake system 1 even upon failure of the electric motor 6.

The electromechanical brake 2 includes at least one friction surface 3 and at least one brake lining 5 to interact with the friction surface 3. The friction surface 3 can be designed in particular as a brake disk of a disk brake or as a brake drum surface in a drum brake. Furthermore, the friction surface can be designed in the form of a rail, for example if a linear movement is braked.

The at least one brake lining 5 is fastened on at least one lining support 4. Preferably, multiple brake linings 5 are provided per friction surface 3 in each brake 2.

The at least one electric motor 6 is connected by means of an actuating mechanism 7 to the lining support 4 to move it, or the lining support 6 is mounted on the actuating mechanism 7. For example, the actuating mechanism 7 can be designed as part of a wedge brake or a ball screw brake or a ball ramp brake. Furthermore, the actuating mechanism 7 can include cams or eccentrics. However, the present invention can be implemented independently of a special embodiment of the actuating mechanism 7.

According to one preferred refinement of the present invention, it is furthermore provided that the actuating mechanism 7 has a nonlinear transmission ratio. This is to be understood in such a way that the actuating mechanism 7 has a mechanical input which is connected to the electric motor 6, that the actuating mechanism 7 has a mechanical output which is connected to the lining support 4, and that the actuating mechanism 7 is designed in such a way that a movement at the input is related via a predefinable nonlinear relationship to a movement of the output. In other words: a specific input-side adjustment, therefore a mechanical input variable, is not mapped by means of a linear relationship, but rather by means of a nonlinear relationship on an adjustment or movement of the lining support 4. In particular, such a nonlinear actuating mechanism 7 is designed in such a way that a gap 11 between an idle position of the brake lining 5 and the friction surface 3 can be covered very quickly or with only slight movement of the electric motor 6. In particular, it is provided that the electric motor 6 is operated in an optimum range in which a secure brake actuation is also possible via tolerances. Furthermore, it is preferably provided that the electric motor 6 is operated in the range of a contact position of the brake lining 5 on the friction surface 3 in such a way that the electric motor 6 is operated in a range in which it has its highest power to be output.

Such a nonlinear relationship can be achieved, for example, by means of at least one cam, which is shaped accordingly. A corresponding nonlinearity is stored, preferably in the form of a transfer function or a transfer set, in a storage unit 13 of the brake system 1 and is available to the control and monitoring unit 9.

To bridge the gap 11 quickly, it can furthermore be provided that the electric motor 6 is possibly operated by means of so-called field attenuation at an elevated speed.

The advantages of the mechanically achieved nonlinearity can thus be supplemented according to the method by utilization of such possibilities of the electric motor, thus that the electric motor 6 is operated at high speed but reduced motor torque in return, as is possible, for example, using field attenuation or by switching over the windings, for example pole pair numbers.

The lining support 4 is provided to carry out a first movement in at least one first movement direction or be moved in such a first movement by means of the electric motor 6, and possibly after corresponding redirection by the actuating mechanism 7. Preferably, the first movement of the lining support 4 is viewed as its movement in the direction toward the friction surface 3.

The lining support 4 is furthermore provided to be moved in a second movement in at least one second movement direction by means of the electric motor 6, wherein the second movement is oriented against the first movement. Preferably, the second movement of the lining support 4 is considered to be its movement away from the friction surface 3.

The brake 2 preferably furthermore includes at least one readjustment device 8, which is connected to the actuating mechanism 7, wherein this readjustment device 8 is only provided in particularly preferred embodiments. Mechanical readjustment devices 8 are known, in particular from the field of truck brakes for many decades in different embodiment variants and are standard at least in truck brakes. In the present brake system 1, a less accurate readjustment or inaccuracy of the readjustment devices 8 can also be compensated for.

The brake 2 furthermore preferably includes at least one mechanical energy storage unit, which is formed in particular as a spring, which acts at least indirectly on the lining support 4. Such springs in brakes are known per se and are widespread. Such springs typically increase a hysteresis effect between the behavior of the brake 2 during the first movement in relation to the second movement. In the present brake system 1, this differing influence of the spring and its age-related changes, such as the spring stiffness, can also be recognized and compensated for.

The brake system 1 includes a control and monitoring unit 9, which is provided and designed accordingly to receive a braking action request on the input side and to generate a brake control signal on the basis of the braking action request and output it to the regulator 10 of the electric motor 6.

The control and monitoring unit 9 is formed in particular comprising a microcontroller and/or microprocessor, wherein further electronic components or assemblies can be part of the control and monitoring unit 9. The control and monitoring unit 9 can also be formed at least partially as part of a programmable logic component. In particular, the control and monitoring unit 9 can consist of multiple parts or assemblies, wherein individual procedures or processing steps are carried out by specific parts of this plurality of parts or assemblies.

The control and monitoring unit 9 is provided to implement a need for slowing the velocity or deceleration, which is communicated on the part of a human or artificial driver or controller of a vehicle or a human or artificial operator of a machine at an interaction interface 16 of the relevant vehicle or the relevant machine, in a corresponding actuation of the electric motor 6 of the brake 2. The interaction interface 16 can be, for example, a sensor on the so-called brake pedal, a messaging interface of a vehicle computer, or an operating element on a control board. An input interface of the present brake system 1 is—as part of a vehicle—at least indirectly connected to the interaction interface 16 of the relevant vehicle.

The control and monitoring unit 9 causes the first and second movements of the lining support 4, which each take place at least with cooperation of the electric motor 6. A change of at least one operating parameter of the brake 2 occurs while the first or the second movement is carried out.

An operating parameter is in this case in particular a variable, the change, control, or regulation of which is required for the fundamental operation of the brake 2. In particular, the operating parameter is a current, using which the electric motor 6 is activated or which is consumed by the electric motor 6. In particular, it is therefore provided that the first operating parameter is a current consumption of the electric motor 6, and that the first value is a first current consumption $I_1$ of the electric motor 6, and that the second value is a second current consumption $I_2$ of the electric motor 6.

As already described at the outset, approaches are already known for controlling or regulating a brake via the current consumption of a driving electric motor 6 to regulate its torque, which can also be referred to as the motor torque. The torque is preferably used as the actual control variable. Since motor current and torque are known to be related, these terms are considered to be equivalent hereinafter.

It is to be noted here that a direct relationship between the torque of the electric motor 6 and its current consumption and/or the contact pressure of the brake lining 5 on the friction surface 3 is only provided if the further provided actuating mechanism 7 is linear. Thus, only if the actuating mechanism 7 does not have a nonlinear transmission ratio variable over the actuation stroke. Therefore, if the actuating mechanism 7 is accordingly not made linear, this also has to be taken into consideration in the control or regulation, via the transmission function stored in the storage unit 13, since otherwise a corresponding control or regulation is not possible.

Furthermore, it is provided according to one preferred embodiment that the relationship between torque and current consumption of the electric motor 6 is furthermore adapted to specific parameters, which parameters comprise in particular: speed, magnetic attenuation because of aging, temperature. Since the moving masses of the electric motor do not change, this or the corresponding inertia can also be taken into consideration in the operating behavior values. The changes on the electric motor are also taken into consideration when carrying out the present method with ascertainment of corresponding correction factors.

The terms control and regulation are used equivalently in the present case.

The at least one operating parameter can also be a power consumption, a voltage, or an energy.

From the preferred design of the regulator 10 as a vector regulator, both the current $I_q$ of the vector regulator as the current consumption value of the electric motor 6 and also the position of the rotor of the relevant electric motor 6 in relation to its stator are available as operating parameters.

It is preferably provided that ascertained operating parameters are not excessively low pass filtered or smoothed before they are processed by the control and monitoring unit 9 or the regulator 10, since the temporal responsiveness of the brake system 1 is thus reduced. However, since dispensing with low pass filtering entirely would have the result that the entire controlled system already reacts to ultrasmall interfering influences with slight changes of the position in each case, and colloquially speaking reacts "nervously". These requirements, which are in opposition as such, of a certain temporal stability in conjunction with a short reaction time can be achieved in that the ascertained operating parameters, in particular current and/or torque values, are obtained by means of a so-called compensated voltage divider, as is known, for example, from a probe for an oscilloscope. The corresponding voltage divider can be obtained, for example, and preferably not restrictively, by combination of a high-pass filter with a low-pass filter.

A measured variable of a force measuring system, in particular a normal force sensor, or a measured variable of a brake torque sensor is preferably not an operating parameter. Accordingly, it is preferably provided that the brake system 1 is formed free of a force measuring system, in particular free of a normal force sensor, and/or also functions without the measured values of a corresponding force measuring system or normal force sensor.

It is provided that at least one such operating parameter is transmitted as an input variable to the control and monitoring unit 9. Acquiring and processing more than one operating parameter can also be provided.

While the lining support 4 carries out the first movement, at least one first value, in particular at least one first value set of an operating parameter is ascertained. While the lining support 4 carries out the second movement, at least one second value, in particular at least one second value set of the operating parameter is ascertained.

Figure 2:
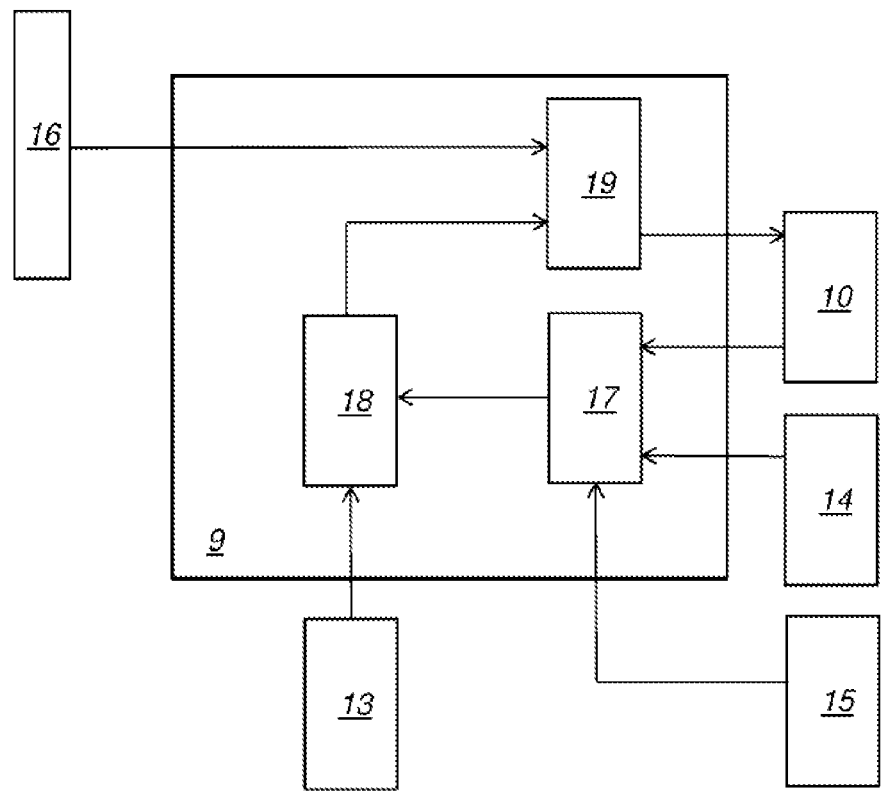
FIG. 2 shows a block diagram of a part of a second embodiment of a present brake system.

It is provided that the control and monitoring unit 9 is designed to ascertain at least one operating behavior value for a real operating behavior of the relevant brake 2 from the at least one first value, in particular the first value set of the operating parameter and the at least one second value, in particular the second value set of the operating parameter. Preferably, the control and monitoring unit 9 ascertains an operating behavior value set, preferably an operating behavior function. This is illustrated by the block 17 in FIG. 2.

The control and monitoring unit 9 is furthermore designed to compare the at least one operating behavior value to at least one operating behavior expectation or one operating behavior expected value. By way of a comparison of the at least one operating behavior value to at least one stored operating behavior expectation, the control and monitoring unit 9 designed for this purpose furthermore ascertains or forms at least one correction factor. In particular, the control and monitoring unit 9 forms or ascertains at least one correction factor set, preferably at least one correction curve.

The control and monitoring unit 9 is furthermore designed, in the case of a braking action request applied to its input, to correct a brake control signal derived or formed therefrom by the at least one correction factor, in particular the correction factor set, preferably the correction curve, and to activate the regulator 10 using the corrected brake control signal. This is illustrated by the block 19 in FIG. 2.

In that the first and the opposing second movement of the lining support 4 are always considered for the formation of the corresponding at least one correction factor, the respective differing behavior or the properties of the brake 2 can be incorporated very well into the control. It is unimportant as such for the ascertained deviations which specific causes they have or which plurality of causes together result in the ascertained or observed deviation. It is essential that they are taken into consideration.

To ascertain the at least one correction factor, the control and monitoring unit 9 includes a unit 18, which is designed to compare the ascertained real operating behavior values to the stored operating behavior expectations and to form a corresponding correction value. This is possible in different variants in the context of the digital signal processing and does not have to be explained in greater detail.

The at least one operating behavior expectation or the at least one operating behavior expected value is stored in a storage unit 13, which is part of the electromechanical brake system 1, and which is connected to the control and monitoring unit 9.

Furthermore, general data on a specific brake 2 are stored in the storage unit 13. These are in particular the target dimensions of the brake, and the target coefficients of friction. Furthermore, at least the last correction values ascertained before the respective brake system 1 was taken out of operation are stored here.

The first and the second movement can be carried out at different times or in different operating states of the brake system 1. Furthermore, the amount of the first and second movement can be very different, depending on the operating states during which they are carried out.

It is preferably provided that the control and monitoring unit 9 is designed to activate the electric motor 6 in at least one time period free of a braking action request in such a way that the first movement and the second movement of the lining support 4 only take place within a gap 11 between friction surface 3 and brake lining 5. The two movements therefore take place without any contact of the brake lining 5 with the brake disk or the friction surface 3, respectively. The at least one correction factor ascertained here depicts in particular internal losses, such as friction losses and hysteresis effects on the bearings, and/or properties, in particular elasticity and inertia, of the brake 2. Effects because of adhesive-sliding friction transitions are also acquired.

In particular, it is provided that this type of the first and second movement is carried out each time the vehicle, in which the relevant brake system 1 is installed, is put into operation again, whereby the first braking procedure of each newly beginning journey already takes place with respective present correction values. A high accuracy of the braking action can thus already be achieved during the first actuation.

If the brake system 1 comprises a spring, a calibration of the brake system 1 can also take place. The spring stiffness of the spring is known to the control and monitoring unit 9. In particular, it is provided that it is metrologically ascertained in the context of a final acceptance of a newly manufactured brake system 1 and is stored in the storage unit 13. When the first and the second movement are carried out, the friction losses and the spring act, wherein the spring exerts an opposing force depending on the movement direction. In particular if a nonlinear actuating mechanism designed to rapidly overcome the gap 11 is provided, this type of calibration in the case of first and the second movements only within the gap 11 functions very well, even if the force on the part of the spring is very minor here.

Furthermore, it is preferably provided that this type of the first and second movement is repeated during the journey of the vehicle at short time intervals, for example every 10 minutes. A braking procedure after a long phase without braking can also be referred to as a first braking procedure. A braking after a predefinable large change of the environment can also.

Furthermore, it is preferably provided that the control and monitoring unit 9 is designed to activate the electric motor 6 during a braking procedure in such a way that the first movement and the second movement of the lining support 4 are superimposed on the pressure of the brake lining 5 against the friction surface 3. This corresponds to the superposition of a DC signal with a minor AC signal. This can be more of an increase or reduction of the contact pressure than a noticeable movement of the lining support 4.

The at least one correction factor ascertained here depicts in particular properties of the friction surface 3 and the brake lining 5 at the time of the braking procedure, wherein furthermore the elasticity and stiffness of the brake 2 can also have influence on the ascertained correction factor.

In particular, it is provided that the respective newly ascertained data are immediately input into the activation of the electric motor 6.

In this context, it is preferably provided that the control and monitoring unit 9 is designed to control the first and second movement of the lining support 4 in such a way that variations of the motor torque of the electric motor 6 thus caused are less than 3% of a respective brake motor torque. In this way, data can be ascertained, wherein the variations in the contact pressure of the brake linings 5 on the friction surface 3 are sufficiently small that they are not perceptible to a driver of the vehicle.

According to one preferred refinement of a present brake system 1, it is provided that it is associated with at least one first temperature sensor 14, therefore it is connected to at least one first temperature sensor 14 and/or such a temperature sensor 14 is part of the brake system 1 itself. The first temperature sensor 14 is connected to the control and monitoring unit 9. The sensors can acquire the ambient temperature or temperatures in the brake 2 or the electronics or in the motor, depending on where they are arranged. The control and monitoring unit 9 is designed to read a temperature value from the first temperature sensor 14 at least in the case of a predefinable operating state of the brake system 1, and to select at least one value of the operating behavior expectation from the storage unit 13 for the temperature value. It is accordingly preferably provided in this context that the predefinable plurality of operating behavior expected values, in particular value sets, preferably functions, for the at least one operating behavior expectation are each stored for at least two, in particular for a predefinable plurality of different temperatures in the storage unit 13.

In particular, it is provided that the reading of the temperature and its consideration takes place in the course of the startup of the correspondingly equipped vehicle. Furthermore, it is preferably provided that its reading and consideration take place at predefinable intervals and/or upon exceeding a predefinable limiting temperature interval. The brake system 1 can thus be adapted to the ambient conditions even before it is first actuated or after a longer period of nonuse. A particularly high accuracy of the temperature sensor 14 is not necessary since it only helps to select so-called default values or settings for the operation of the brake system 1. As soon as the brake system 1 is in operation, a further adaptation of the brake system 1 is performed by carrying out the first and second movement of the lining support.

The control of the brake 2 can take place in two different ways, either as a so-called "position control" of the at least one brake lining 5, or by specifying a target braking torque, in the form of a motor torque to be achieved.

In the "position control", the motor position is predefined, in particular as a motor rotation arc length or as an angle or as a position of a predefinable part of the actuating mechanism 7 or the lining support 4 or the brake lining 5. A relationship between a specific position and a specific torque of the electric motor to be expected upon reaching the position can be ascertained via the present known properties of the brake, or such a relationship is stored as an expected value in the storage unit 13. The torque to be expected can in turn be specified as the current consumption to be expected or as the current consumption expected value of the electric motor 6.

It is preferably provided that the predefinable plurality of operating behavior expected values each link a specific motor rotation arc length to a current consumption expected value of the electric motor 6.

The entire rotation to be carried out by the electric motor 6 is referred to as the motor rotation arc length, which generally—due to a corresponding transmission ratio of the actuating mechanism 7—represents more than one complete revolution. Although the arc length is measured in radians by definition, in practice the specification of a value in degrees is typical. For example, the motor rotation arc length can be 870°. This means that the electric motor 6—starting from an idle position—carries out two complete revolutions, followed by a further 150°.

The control and monitoring unit 9 is accordingly preferably designed upon input of a braking action request to generate a brake control signal using the operating behavior expectation and the at least one correction value and output it to the regulator 10. An accurate position control of the electric motor 6 or the braking action is thus possible.

One advantage of the position control is that it only causes very minor hysteresis effects on the brake lining 5. Since a specific position is predefined, the electric motor 6 is also moved or actuated so that this position or a corresponding position corrected by a correction value is also reached, wherein adhesive friction and sliding friction effects are hardly relevant, since it is necessary for the change of a position to leave an idle or starting position, and to do so notwithstanding any possible adhesive friction effects.

It is furthermore preferably provided in conjunction with the so-called position control that regulation is designed without limit of the maximum current consumption by the electric motor 6, or that a corresponding limit is only valid for certain operating states and can be exceeded in other operating states. This is advantageous in particular in conjunction with so-called BLDC motors, which—due to the typically low coil resistance—often have very high startup currents. It is furthermore preferably provided that the control and monitoring unit 9 ascertains a target acceleration from a braking action request and the presently prevailing position data, and also a chain of position steps, in such a way that current peaks, as often occur during the startup of an electric motor, are avoided as much as possible, but are not entirely prevented by the control and monitoring unit 9. Current peaks can be substantially avoided and also the operational reliability can be increased by a corresponding design of the control and monitoring unit 9, since in particular in emergency cases, without consideration of the further fate of the system, the maximum possible current consumption is permitted on the part of the brake system. Thus, for example, emergency or hazard braking can be carried out without limiting the maximum current consumption while incorporating all available means or resources.

In the specification of a target braking torque, this can also be referred to as "force controlled" or force control or torque control, a torque of the electric motor is predefined. A different torque or a force at another point or at another part of the brake 2 can also be predefined, if this torque or this force is related directly, therefore solely via mechanical parts, such as gearing and/or linkage, to the drive by the electric motor 6.

It is therefore furthermore preferably provided in this context that the control and monitoring unit 9 is designed to ascertain the brake control signal in the form of a motor torque to be achieved by the electric motor 6, and that the control and monitoring unit 9 is designed to compare the motor rotation arc length of the electric motor 6 to a corresponding motor rotation arc length expected value, and to adapt the at least one correction value accordingly if a deviation is established. An accurate torque control of the electric motor 6 or the braking action is thus possible.

Furthermore, it is preferably provided that in addition a predefinable number of limits of the possible positions are predefined or stored. These limits are limiting values which are each dependent on the respective operating states, however.

A characteristic of the so-called force control in relation to the position control is that it tends toward a significant hysteresis. If the control and monitoring unit 9, in a situation in which the moving parts of the brake are at rest, for example while the brake lining 5 is pressed against the friction surface 3, only ascertains or outputs such a slightly changed motor torque that the adhesive frictions within the actuating mechanism 7 are not exceeded, in spite of the changed activation, no change of the braking action occurs, since the actuating mechanism 7 itself does not move. However, this hysteresis behavior is ascertained in the present brake system 1 by the movement back and forth of the lining support 4 and is taken into consideration in the at least one correction value, so that this hysteresis is also taken into consideration in the force control.

One special advantage of the specification of a target braking torque is that the torque is proportional to the normal force of the brake lining 5 on the friction surface 3. The respective prevailing stiffness of the brake 2 or its parts has no effects in the case of the control via a target braking torque. Rather, the control and monitoring unit 9 will attempt to achieve the target braking torque.

Of course, it is provided that any possible nonlinear transmission ratios of the actuating mechanism 7 are also taken into consideration in the control or regulation. For example—with corresponding transmission ratio—even only a very slightly changed torque of the electric motor 6 can result in a significant change of the contact pressure. Since the corresponding transmission function of the actuating mechanism 7 is known to the control and monitoring unit 9, however, this is taken into consideration in the control or regulation.

In one particularly advantageous embodiment of the present brake system, both types of control can also be combined: The position control reacts to small position changes, the force control would be independent of the brake stiffness. It is therefore furthermore particularly preferably provided that the control and monitoring unit 9 is designed in such a way that in the case of predefinable minor changes of the braking action request, it activates the electric motor 6 by means of position control to achieve a corresponding change of the braking action, and that the control and monitoring unit 9, in the case of predefinable large changes of the braking action request, activates the electric motor 6 by means of specification of a target braking torque.

It has been shown that the temperature which a brake 2, in particular the brake disk 3, assumes in the course of a braking procedure is a function of the actual braking power of the relevant brake 2. Of course, certain delays occur until the effect of the temperature increase actually takes place as a result of the generated frictional heat, which delay can be viewed as a phase shift or as latency time. However, under the real conditions occurring in a vehicle, it is extremely technically complex to perform a sufficiently accurate measurement of this temperature in order on its basis to achieve a regulation of the electric motor 6 or to perform setting of an accurate braking torque. Moreover, such a measuring arrangement also has to be sufficiently failsafe or redundant.

In a refinement of the present brake system 1, it is provided that it furthermore has at least one brake temperature sensor 15, which is connected to the control and monitoring unit 9, and which is preferably arranged on the at least one lining support 4. Furthermore, it is preferably provided that the predefinable plurality of operating behavior expected values, in particular value sets, preferably functions for the at least one operating behavior expectation, furthermore, takes into consideration the heating and thermal expansion of the brake 2 to be expected due to a braking procedure having a required braking action. An exact measurement of the brake disk temperature is not necessary here, since the temperature ascertained—in the region of the friction surface 3 or the brake lining 5—is solely used to adapt the corresponding correction factors, and in this way to make the control of the brake system 1 more accurate. In this meaning, it is preferably provided that the control and monitoring unit 9 is furthermore designed to conclude an actual braking torque on the basis of a brake temperature ascertained by the brake temperature sensor 15 during a braking procedure using a predefined braking target torque, and to adapt the at least one correction factor in the case of a predefinable deviation of the braking torque from the braking target torque. The temperature ascertained by the brake temperature sensor 15 is itself not a manipulated variable, because of which the present brake system 1 still functions even in the event of soiling or failure of the brake temperature sensor 15.

Upon installation of the brake system 1 in a vehicle, the accuracy of the braking action can furthermore be increased by networking the brake system 1 with sensors of the vehicle. In one refinement, it can therefore preferably be provided that the vehicle includes at least one sensor for ascertaining an individual wheel speed and/or a wheel slip, in particular as part of an ABS and/or ESP of the vehicle, that the sensor is connected at least indirectly to the control and monitoring unit 9 of the brake system 1, that the control and monitoring unit 9 is furthermore designed, during a braking procedure, to compare the wheel speed ascertained by the sensor or the wheel slip to at least one value for a corresponding operating behavior expectation, and to adapt the at least one correction factor in the event of a predefinable deviation.

Preferably, the control and monitoring unit 9 is designed to link the individual ascertained measured values by means of so-called sensor fusion.

The invention claimed is:

1. An electromechanical brake system comprising at least one electromechanical brake, wherein the electromechanical brake comprises:
   at least one friction surface;
   at least one lining support having at least one brake lining;
   at least one electric motor for the predefinable movement of the lining support; and
   an actuating mechanism, on which the lining support is mounted, and which is connected to the electric motor;
   wherein the brake system has a control and monitoring unit adapted to receive a braking action request on the input side and to generate a brake control signal on a basis of the braking action request and output it to a regulator of the electric motor,
   wherein the control and monitoring unit is designed:
      to ascertain, from at least one first value, which is ascertained during a first movement of the lining support by means of the electric motor, of at least one first operating parameter of at least one part of the brake, and at least one second value, which is ascertained during a second movement, opposite to the first movement, of the lining support by means of the electric motor, of the first operating parameter of the part of the brake, at least one operating behavior value for a real operating behavior of the relevant brake, and to ascertain, by a comparison of the at least one real operating behavior value to at least one stored operating behavior expectation, at least one correction factor, and
      to correct the brake control system by the at least one correction factor and to activate the regulator using the corrected brake control signal.

2. The electromechanical brake system as claimed in claim 1, wherein the at least one electromechanical brake further comprises at least one readjustment device.

3. The electromechanical brake system as claimed in claim 1, wherein the at least one operating behavior value comprises an operating behavior value set.

4. The electromechanical brake system as claimed in claim 1, wherein the at least one operating behavior value comprises an operating behavior function.

5. The electromechanical brake system as claimed in claim 1, wherein:
   the at least one correction factor comprises at least one correction factor set; and
   the brake control system is corrected by the correction factor set.

6. The electromechanical brake system as claimed in claim 1, wherein:
   the at least one correction factor comprises at least one correction curve; and
   the brake control system is corrected by the correction curve.

7. The electromechanical brake system as claimed in claim 1, wherein the control and monitoring unit is furthermore designed to activate the electric motor in at least one time period free of a braking action request in such a way that the first movement and the second movement of the lining support only take place within a gap between friction surface and brake lining.

8. The electromechanical brake system as claimed in claim 1, wherein the control and monitoring unit is furthermore designed to activate the electric motor during a braking procedure in such a way that the first movement and the second movement of the lining support are superimposed on the pressure of the lining support against the friction surface.

9. The electromechanical brake system as claimed in claim 8, wherein the control and monitoring unit is designed to control the first and second movement of the lining support in such a way that variations of the motor torque of the electric motor caused thereby are less than 3% of a respective brake motor torque.

10. The electromechanical brake system as claimed in claim 1, wherein the brake furthermore has the at least one spring, which acts at least indirectly on the lining support, wherein the ascertained at least one correction factor furthermore also takes into consideration the spring stiffness of the spring.

11. The electromechanical brake system as claimed in claim 1, wherein the first operating parameter is a current consumption of the electric motor, and in that the first value is a first current consumption $I_1$ of the electric motor, and in that the second value is a second current consumption $I_2$ of the electric motor.

12. The electromechanical brake system as claimed in claim 1, wherein the brake system includes a storage unit associated with the control and monitoring unit, in which a predefinable plurality of operating behavior expected values, in particular value sets, preferably functions for the at least one operating behavior expectation are stored.

13. The electromechanical brake system as claimed in claim 12, wherein the predefinable plurality of operating behavior expected values each link a specific motor rotation arc length to a current consumption expected value of the electric motor.

14. The electromechanical brake system as claimed in claim 1, wherein the control and monitoring unit is designed to generate a brake control signal upon input of a braking action request using the operating behavior expectation and the at least one correction value and output it to the regulator.

15. The electromechanical brake system as claimed in claim 14, wherein the control and monitoring unit is designed to ascertain the brake control signal in the form of a motor rotation arc length to be achieved by the electric motor, and in that the control and monitoring unit is designed to compare the current consumption of the electric motor to the corresponding current consumption expected value, and to adapt the at least one correction value accordingly if a deviation is established.

16. The electromechanical brake system as claimed in claim 14, wherein the control and monitoring unit is designed to ascertain the brake control signal in the form of a motor torque to be achieved by the electric motor, and in that the control and monitoring unit is designed to compare the motor rotation arc length of the electric motor to a corresponding motor rotation arc length expected value, and to adapt the at least one correction value accordingly if a deviation is established.

17. The electromechanical brake system as claimed in claim 12, wherein the predefinable plurality of operating behavior expected values, in particular value sets, preferably functions, for the at least one operating behavior expectation are each stored in the storage unit for at least two, in particular for a predefinable plurality of different ambient temperatures.

18. The electromechanical brake system as claimed in claim 17, wherein at least one first temperature sensor is associated with the brake system, which is connected to the control and monitoring unit, and in that the control and monitoring unit is designed to read a temperature value from the first temperature sensor at least in a predefinable operating state of the brake system, and to select at least one value of the operating behavior expectation from the storage unit for the ambient temperature value.

19. The electromechanical brake system as claimed in claim 12, wherein the predefinable plurality of operating behavior expected values, in particular value sets, preferably functions, for the at least one operating behavior expectation furthermore takes into consideration the heating and thermal expansion of the brake to be expected due to a braking procedure having a required braking action.

20. The electromechanical brake system as claimed in claim 1, wherein the brake system furthermore includes at least one brake temperature sensor, which is connected to the control and monitoring unit, and which is preferably arranged on the at least one lining support.

21. The electromechanical brake system as claimed in claim 20, wherein the control and monitoring unit is furthermore designed to conclude, on the basis of a brake temperature ascertained by the brake temperature sensor during a braking procedure having a predefined braking target torque, an actual braking torque and to adapt the at least one correction factor in the event of a predefinable deviation of the braking torque from the braking target torque.

22. The electromechanical brake system as claimed in claim 1, wherein the electric motor is designed as a brushless DC motor, in that the regulator is designed as a vector regulator, and in that a current $I_q$ of the vector regulator is transmitted as a current consumption value of the electric motor to the control and monitoring unit.

23. The electromechanical brake system as claimed in claim 1, wherein the actuating mechanism includes a mechanical input, which is connected to the electric motor, in that the actuating mechanism includes a mechanical output, which is connected to the lining support, and in that the actuating mechanism is designed in such a way that a movement at the input is related via a predefinable nonlinear relationship to a movement of the output.

24. The electromechanical brake system as claimed claim 23 wherein a transmission function of the actuating mechanism is stored in the storage unit.

25. The electromechanical brake system as claimed in claim 1, wherein the brake system is formed free of force sensors.

26. A vehicle having at least one electromechanical brake system as claimed in claim 1.

27. The vehicle as claimed in claim 26, wherein the vehicle includes at least one sensor for ascertaining at least one of an individual wheel speed and a wheel slip, in that the sensor is connected at least indirectly to the control and monitoring unit of the brake system, in that the control and monitoring unit is furthermore designed, during a braking procedure, to compare the wheel speed ascertained by the sensor or the wheel slip to at least one value for a corresponding operating behavior expectation, and to adapt the at least one correction factor in the event of a predefinable deviation.

28. The vehicle as claimed in claim 27, wherein the at least one sensor is part of at least one of an ABS and an ESP of the vehicle.

29. A method for operating an electromechanical brake system comprising at least one electromechanical brake, wherein the electromechanical brake comprises:
   at least one friction surface;
   at least one lining support having at least one brake lining;
   at least one electric motor for the predefinable movement of the lining support; and
   an actuating mechanism, on which the lining support is mounted, and which is connected to the electric motor;
   wherein the brake system has a control and monitoring unit, wherein a braking action request is received by the control and monitoring unit, wherein a brake control signal is generated by the control and monitoring unit on the basis of the braking action request,
   wherein the brake control signal is output to a regulator of the electric motor,
   wherein at least one value of at least one first operating parameter of at least one part of the brake during a first movement of the lining support is ascertained by means of the electric motor and transmitted to the control and monitoring unit,
   wherein at least one second value of the first operating parameter during a second movement of the lining support, opposite to the first movement, is ascertained by means of the electric motor and transmitted to the control and monitoring unit, wherein at least one correction factor is ascertained from the first value and the second value by the control and monitoring unit, and wherein the brake control signal is corrected by the control and monitoring unit by the at least one correction factor.

30. The method as claimed in claim 29, wherein the at least one electromechanical brake further comprises at least one readjustment device.

31. The method as claimed in claim 29, wherein:
the at least one correction factor comprises at least one correction factor set; and
the brake control system is corrected by the correction factor set.

32. The method as claimed in claim 29, wherein:
the at least one correction factor comprises at least one correction curve; and
the brake control system is corrected by the correction curve.

* * * * *